(12) United States Patent
Orth

(10) Patent No.: US 12,091,092 B2
(45) Date of Patent: Sep. 17, 2024

(54) MOTOR VEHICLE FLOOR AND MOTOR VEHICLE HAVING A MOTOR VEHICLE FLOOR

(71) Applicant: Dr. Ing. h.c. F. Porsche Aktiengesellschaft, Stuttgart (DE)

(72) Inventor: Christoph Orth, Marbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 420 days.

(21) Appl. No.: 17/674,000

(22) Filed: Feb. 17, 2022

(65) Prior Publication Data

US 2022/0266922 A1    Aug. 25, 2022

(30) Foreign Application Priority Data

Feb. 19, 2021    (DE) ..................... 10 2021 103 988.6

(51) Int. Cl.
*B62D 25/20*    (2006.01)
*B60K 1/04*    (2019.01)
*B60K 1/00*    (2006.01)

(52) U.S. Cl.
CPC ............... *B62D 25/20* (2013.01); *B60K 1/04* (2013.01); *B60K 2001/005* (2013.01); *B60K 2001/0438* (2013.01)

(58) Field of Classification Search
CPC .... B62D 25/20; B60K 1/04; B60K 2001/005; B60K 2001/0438
See application file for complete search history.

(56) References Cited

U.S. PATENT DOCUMENTS

| | | | | |
|---|---|---|---|---|
| 5,501,289 | A * | 3/1996 | Nishikawa | B60K 1/04 280/783 |
| 8,859,126 | B2 * | 10/2014 | Yamada | H01M 10/66 429/153 |
| 8,960,350 | B2 * | 2/2015 | Kosaki | H01M 10/44 180/68.5 |
| 9,227,582 | B2 * | 1/2016 | Katayama | H01M 50/24 |
| 9,306,251 | B2 * | 4/2016 | Inoue | H01M 10/613 |
| 9,440,523 | B2 | 9/2016 | Decker | |
| 9,533,631 | B2 * | 1/2017 | Kamimura | H01M 50/249 |
| 9,758,028 | B2 * | 9/2017 | Ikeda | B62D 29/043 |
| 2012/0312614 | A1 * | 12/2012 | Fujiwara | H01M 50/209 180/68.5 |

(Continued)

FOREIGN PATENT DOCUMENTS

DE    102006052601 A1    5/2008
DE    102014107388 A1    11/2015
(Continued)

*Primary Examiner* — Jacob B Meyer
(74) *Attorney, Agent, or Firm* — Buchanan Ingersoll & Rooney PC

(57) ABSTRACT

The invention relates to a motor vehicle floor of a motor vehicle, which motor vehicle floor separates a motor vehicle interior from an outside space. The motor vehicle floor has fluid ducts for a fluid for controlling the temperature of the motor vehicle floor to flow through. At least one fastener is furthermore provided in a region beneath the fluid ducts on the motor vehicle floor, which fastener allows mechanical and thermal contact-connection of at least one electrical energy storage element to the motor vehicle floor.

10 Claims, 1 Drawing Sheet

(56) References Cited

U.S. PATENT DOCUMENTS

| | | | |
|---|---|---|---|
| 2014/0262573 A1* | 9/2014 | Ito ............................ | B60K 1/04 |
| | | | 180/68.5 |
| 2014/0315064 A1* | 10/2014 | Katayama ......... | H01M 10/6561 |
| | | | 429/120 |
| 2022/0017152 A1* | 1/2022 | Kecalevic .............. | B62D 25/20 |
| 2022/0176791 A1* | 6/2022 | Danneberg ............... | B60K 1/04 |
| 2022/0266922 A1* | 8/2022 | Orth ....................... | B62D 25/20 |
| 2023/0045568 A1* | 2/2023 | Danneberg ............... | B60K 1/04 |
| 2024/0010063 A1* | 1/2024 | Schilling ............. | H01M 50/249 |

FOREIGN PATENT DOCUMENTS

| | | | | |
|---|---|---|---|---|
| DE | 102016102139 A1 | 8/2017 | | |
| DE | 102018209113 B3 | 11/2019 | | |
| WO | WO-2020120068 A1 * | 6/2020 | ............... | B60K 1/04 |

* cited by examiner

MOTOR VEHICLE FLOOR AND MOTOR VEHICLE HAVING A MOTOR VEHICLE FLOOR

CROSS-REFERENCE TO RELATED APPLICATION

This application claims priority to German Patent Application No. 10 2021 103 988.6, filed Feb. 19, 2021, the content of such application being incorporated by reference herein in its entirety.

FIELD OF THE INVENTION

The invention relates to a motor vehicle floor and to a motor vehicle having such a motor vehicle floor.

BACKGROUND OF THE INVENTION

In motor vehicles, it is known that the body has a vehicle floor as an underbody, which vehicle floor separates the vehicle interior from the outside space below the vehicle. Here, the vehicle floor also serves to fasten assemblies arranged under the motor vehicle.

In electric vehicles or hybrid vehicles with an internal combustion engine and an electric motor, it is known that an electrical energy store, also known as a battery, is installed in order to be able to provide the electrical energy required for driving the motor vehicle and in order to be able to again store electrical energy recovered during driving. Such energy stores are typically very large and therefore require a relatively large amount of installation space. The integration of such a large assembly is also challenging in some cases, and for this reason vehicles increasingly have underfloor arrangement of the electrical energy store, so that the electrical energy storage element is arranged beneath the vehicle floor, designed as an underbody, of the vehicle body. Here, the electrical energy storage element is often also supplied with cooling or heating coolant by way of a coolant supply, said coolant flowing through cooling ducts of a housing or a carrier plate of the electrical energy store.

For example, DE 10 2014 107 388 A1, which is incorporated by reference herein, and DE 10 2016 102 139 A1, which is also incorporated by reference herein, disclose that an electrical energy storage element is arranged on a double plate of a holder, wherein the upper plate serves as a bulkhead wall device and the lower plate serves as an armor plate for protecting the electrical energy storage element against impacts from below. Such a double plate can be fitted, as a floor unit of a holder, under the vehicle floor in order to be able to arrange and support the energy storage element thereon. Here, the double plate simultaneously serves to hold the energy storage element and as a cooling plate and as a protection means against impacts from below.

Such an arrangement has the disadvantage that the electrical energy storage element is arranged beneath the vehicle floor and is also shielded from below by the plate of the holder, so that the electrical energy storage element is not readily accessible. For repair work, the energy storage element has to be accessed from below and coolant supply lines to the plate have to be detached so that access to the energy storage element is possible. This has repeatedly proven to be cumbersome because it also requires refilling of the coolant circuit.

SUMMARY OF THE INVENTION

An exemplary embodiment of the invention relates to a motor vehicle floor of a motor vehicle, which motor vehicle floor separates a motor vehicle interior, in particular a passenger compartment, from an outside space, wherein the motor vehicle floor has fluid ducts for a fluid for controlling the temperature of the motor vehicle floor to flow through, wherein at least one fastening means is furthermore provided in a region beneath the fluid ducts on the motor vehicle floor, which fastening means allows mechanical and thermal contact-connection of at least one electrical energy storage element (also referred to herein as a 'store') to the motor vehicle floor. Owing to the integration of the fluid ducts for a fluid, for example a cooling fluid of an internal combustion engine and/or an electric motor, to flow through, the temperature of both the motor vehicle interior and also of the electrical energy storage element can be controlled. For example, the motor vehicle interior can be heated and simultaneously the electrical energy storage element can be heated or cooled, depending on the temperature of the fluid flowing through and the temperature of the electrical energy store. In the event of an accident, in particular in the event of a serious accident in which there is also a risk of fire in an electrical energy store, the fluid can flow onto the electrical energy storage element arranged beneath it if the fluid ducts rupture, and this can mean further cooling of the electrical energy store. As a result, the reaction speed and therefore also temperature development can be reduced. In particular, it may also be useful if the fluid is electrically conductive and therefore can create a short circuit. As a result, stored electrical energy can be reduced more rapidly since relatively low voltages and energies can be short-circuited via the fluid.

It would also be possible to provide an accident-proof fluid connection, so that the electrical energy store can be flooded with a coolant, for example by the fire service, after an accident. For example, coolant could be provided by means of an extinguishing lance via the fluid connection in order to flood the electrical energy store with the coolant as fluid.

The vehicle floor through which fluid flows also serves as a barrier to thermal energy in the direction of the motor vehicle interior, so that in the event of an accident the thermal energy originating from the electrical energy store is not conducted in the direction of the motor vehicle interior as quickly, this granting more time for the motor vehicle interior to be evacuated, for example.

In a further exemplary embodiment, it is also expedient when a thermal contact area is formed in the region of the fluid ducts on the underside of the motor vehicle floor. As a result, it is particularly effectively possible to thermally couple at least one electrical energy storage element to the motor vehicle floor through which fluid flows or through which fluid can flow since the electrical energy store, by way of a dedicated contact area, is brought into contact with the thermal contact area of the motor vehicle floor. This can be done by pressing, for example by means of the fastening means.

In a further exemplary embodiment, it is also advantageous when the at least one electrical energy store can be thermally contact-connected to the thermal contact area and held thereon by means of the at least one fastening means. In this way, the at least one electrical energy store can be mechanically and thermally held on the thermal contact area of the motor vehicle floor and, if required, can also be pressed against it. As a result, good thermal transfer can be achieved.

It is also expedient when a thermally conductive element is provided between the electrical energy store and the thermal contact area, which thermally conductive element improves the thermal contact between the electrical energy store and the thermal contact area. As a result, the thermal resistance between the thermal contact area and the electrical energy store can additionally be reduced. The thermally conductive element is preferably a plastic or elastic and highly thermally conductive element, such as a film or foil, a paste etc.

It is also advantageous when the motor vehicle floor is a floor of a passenger compartment. In this way, the motor vehicle floor can serve both to thermally treat the electrical energy store and also to thermally treat the passenger compartment.

In a further exemplary embodiment, it is also expedient when the fluid ducts are made directly in the motor vehicle floor, in particular by extrusion or by connecting tubes or flat tubes for forming a segment of the motor vehicle floor in regions.

In a further exemplary embodiment, it is also expedient when centering means are provided, which centering means serve to position the at least one electrical energy store on the motor vehicle floor. Therefore, the at least one electrical energy store can be arranged in the correct position, so that incorrect positioning, which could have a negative effect on the thermal treatment of the electrical energy store and result in failure of said electrical energy store, does not occur during mounting.

An exemplary embodiment of the invention relates to a motor vehicle having a motor vehicle floor according to aspects of the invention and having an electrical energy store, wherein the electrical energy storage element is arranged beneath the fluid ducts of the motor vehicle floor and is in thermal contact with the motor vehicle floor. As a result, improved cooling or heating can take place and, in the event of an accident, the motor vehicle floor according to aspects of the invention can utilize its abovementioned advantages in respect of increased occupant safety and improved cooling of the electrical energy store.

It is also advantageous when the at least one fastening means holds and fastens the at least one electrical energy store on the motor vehicle floor in a thermally contact-connected manner. In this way, permanently secure arrangement and thermal contact-connection are achieved.

It is also advantageous when a paneling element for at least partially covering the electrical energy store is arranged beneath the underbody and beneath the at least one electrical energy store. In this way, the at least one electrical energy store can also be protected from below.

BRIEF DESCRIPTION OF THE DRAWINGS

The invention will be explained in more detail below using an exemplary embodiment with reference to the drawing, in which.

DETAILED DESCRIPTION OF THE INVENTION

Figure 1:
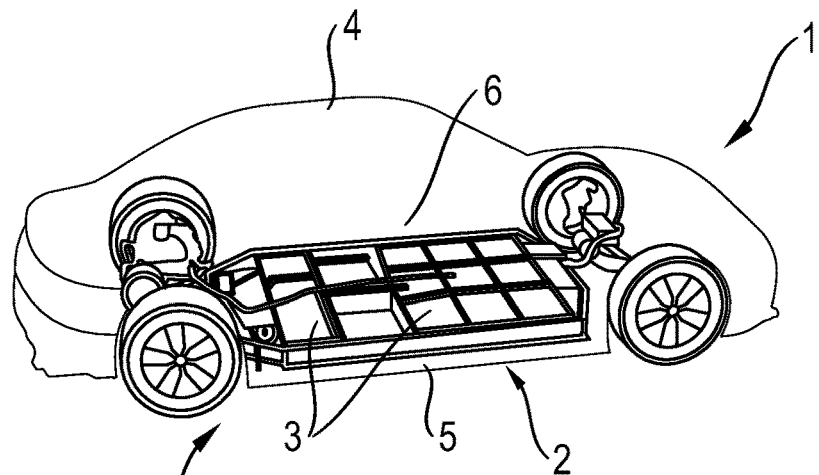
FIG. 1 shows a schematic view of a motor vehicle having a schematically illustrated number of electrical energy storage elements.

FIG. 1 shows a schematic illustration of a motor vehicle 1 having an arrangement of a plurality of electrical energy storage elements 3, such as batteries, arranged in a floor region 2. The electrical energy storage elements 3 serve to supply power to the provided electric motors in the form of drive motors for driving the motor vehicle 1 and for storing electrical energy which is recovered, for example, during braking of the motor vehicle 1.

The motor vehicle 1 according to aspects of the invention has a body 4 which has a motor vehicle floor 5 as the underbody, which motor vehicle floor separates a motor vehicle interior 6 from an outside space 7 below the motor vehicle 1. The motor vehicle floor 5 is preferably a floor of a passenger compartment.

Figure 2:
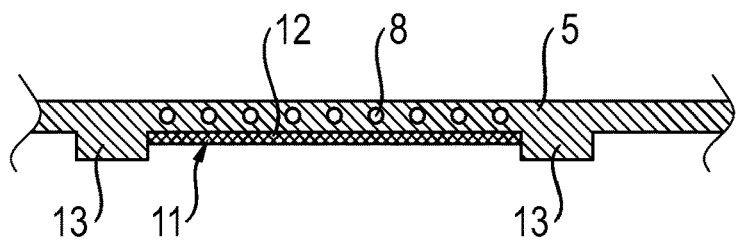
FIG. 2 shows a schematic view of a motor vehicle floor according to aspects of the invention and FIG. 3 shows a schematic view of a motor vehicle floor according to aspects of the invention having an electrical energy store.
Figure 3:
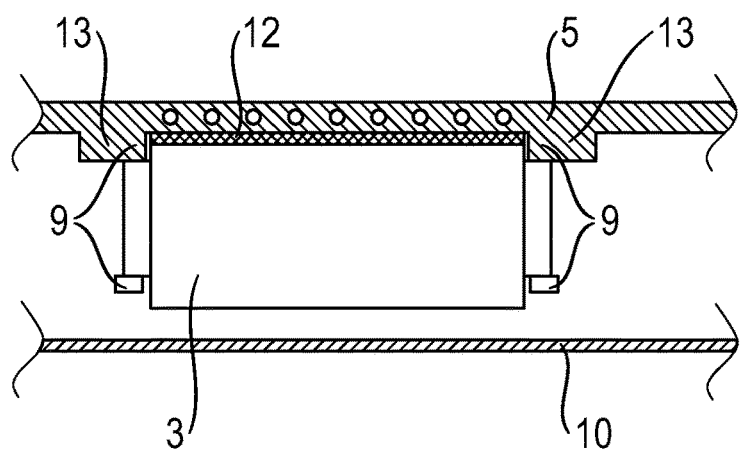

FIGS. 2 and 3 schematically illustrate a portion of such a motor vehicle floor 5 in a section. It can be seen that the motor vehicle floor has fluid ducts 8 which are provided for a fluid for controlling the temperature of the motor vehicle floor 5 to flow through. The cooling ducts 8 are arranged adjacent to one another and at the same time pass through the motor vehicle floor 5 itself.

In this case, the region of the motor vehicle floor 5 formed with cooling ducts 8 can be designed as an extruded element or can be formed by lining up and connecting flat tubes etc., so that a flat region of the motor vehicle floor 5 is produced, which flat region comprises and integrates the fluid ducts 8.

According to FIG. 3, at least one fastening means 9 is furthermore provided in a region beneath the fluid ducts 8 on the motor vehicle floor 5, which fastening means allows mechanical and thermal contact-connection of at least one electrical energy storage element 3 to the motor vehicle floor 5. In the example shown, the fastening means 9 are means for screwing the energy storage element 3 to the motor vehicle floor 5. The fastening means 9 may be a screw, bolt, hook, latch, hanger, post, and/or bracket, for example.

FIG. 3 shows a motor vehicle floor 5 according to aspects of the invention having an electrical energy storage element 3, wherein the electrical energy storage element 3 is arranged beneath the fluid ducts 8 of the motor vehicle floor 5 and is in thermal contact with the motor vehicle floor 5. Here, the term "beneath" is intended to be understood as being geodetic in the normal vehicle position, that is to say when the motor vehicle 1 is situated on a flat road or surface. In this case, the electrical energy storage element 3 is arranged beneath the motor vehicle floor.

The electrical energy storage element 3 is in thermal contact and advantageously also in mechanical contact with the motor vehicle floor 5 and is held on the motor vehicle floor 5 and preferably pressed against the motor vehicle floor 5 by means of the fastening means 9.

The at least one fastening means 9 holds the at least one electrical energy storage element 3 on the motor vehicle floor 5 in a thermally contacted manner and preferably fastens it to the motor vehicle floor. The electrical energy storage element 3 and the motor vehicle floor form a kind of sandwich arrangement.

It can furthermore be seen in FIG. 3 that, in an advantageous exemplary embodiment, a paneling element 10 for at least partially covering the electrical energy storage element 3 is arranged beneath the motor vehicle floor 5 designed as the underbody and beneath the at least one electrical energy storage element 3. This paneling element can protect the energy storage element against dirt and against mechanical actions.

The motor vehicle floor advantageously has a thermal contact area 11 in the region of the fluid ducts 8 on the underside of the motor vehicle floor 5, wherein the contact area 11 is advantageously formed by the motor vehicle floor itself.

The fastening means 9 serve to allow the electrical energy storage element 3, by way of one of its surfaces, to be thermally contact-connected to the thermal contact area 11 and held thereon.

For improved thermal contact-connection between the electrical energy storage element 3 and the thermal contact area 11, a thermally conductive element 12 which improves the thermal contact between the electrical energy storage element 3 and the thermal contact area 11 can be provided. In this case, the thermally conductive element may be designed, for example, as a film or foil, as a compound etc.

It can also be seen in FIG. 3 that centering means 13 are provided, which centering means serve to position the at least one electrical energy storage element 3 on the motor vehicle floor 5. Therefore, the centering means 13 are designed as projections between which the electrical energy storage element 3 can be arranged. The side flanks of the projections serve to arrange the electrical energy storage element 3 in the correct position. Centering means 13 may be one or more projections, surfaces, fasteners, brackets, or openings, for example.

LIST OF REFERENCE SIGNS

1 Motor vehicle
2 Floor region
3 Energy store/storage element
4 Body
5 Motor vehicle floor
6 Motor vehicle interior
7 Outside space
8 Fluid duct
9 Fastening means
10 Paneling element
11 Contact area
12 Element
13 Centering means

What is claimed is:

1. A motor vehicle floor of a motor vehicle, which motor vehicle floor separates a motor vehicle interior from an outside space, wherein the motor vehicle floor comprises:
    fluid ducts through which a fluid flows for controlling a temperature of the motor vehicle floor,
    at least one fastener disposed in a region beneath the fluid ducts on the motor vehicle floor, which fastener is configured to permit mechanical and thermal contact-connection between at least one electrical energy storage element and the motor vehicle floor.

2. The motor vehicle floor as claimed in claim 1, wherein a thermal contact area is disposed on an underside of the motor vehicle floor in a region beneath the fluid ducts.

3. The motor vehicle floor as claimed in claim 2, wherein the at least one electrical energy storage element is thermally contact-connected to the thermal contact area and held thereon by the at least one fastener.

4. The motor vehicle floor as claimed in claim 3, further comprising a thermally conductive element disposed between the electrical energy storage element and the thermal contact area, which thermally conductive element is configured to conduct thermal energy between the electrical energy storage element and the thermal contact area.

5. The motor vehicle floor as claimed in claim 1, wherein the motor vehicle floor is a floor of a passenger compartment of the motor vehicle.

6. The motor vehicle floor as claimed in claim 1, wherein the fluid ducts are embedded in the motor vehicle floor by extrusion or by connecting tubes or flat tubes for forming a segment of the motor vehicle floor in regions.

7. The motor vehicle floor as claimed in claim 1, further comprising centering means for positioning the at least one electrical energy storage element on the motor vehicle floor.

8. A motor vehicle having the motor vehicle floor and the at least one electrical energy storage element of claim 1, wherein the electrical energy storage element is arranged beneath the fluid ducts of the motor vehicle floor and is in thermal contact with the motor vehicle floor.

9. The motor vehicle as claimed in claim 8, wherein the at least one fastener holds and fastens the at least one electrical energy storage element on the motor vehicle floor in a thermally contacted manner.

10. The motor vehicle as claimed in claim 8, further comprising a paneling element that at least partially covers the electrical energy storage element, wherein the paneling element is arranged beneath the motor vehicle floor and beneath the at least one electrical energy storage element.

* * * * *